Figures 4, 5:
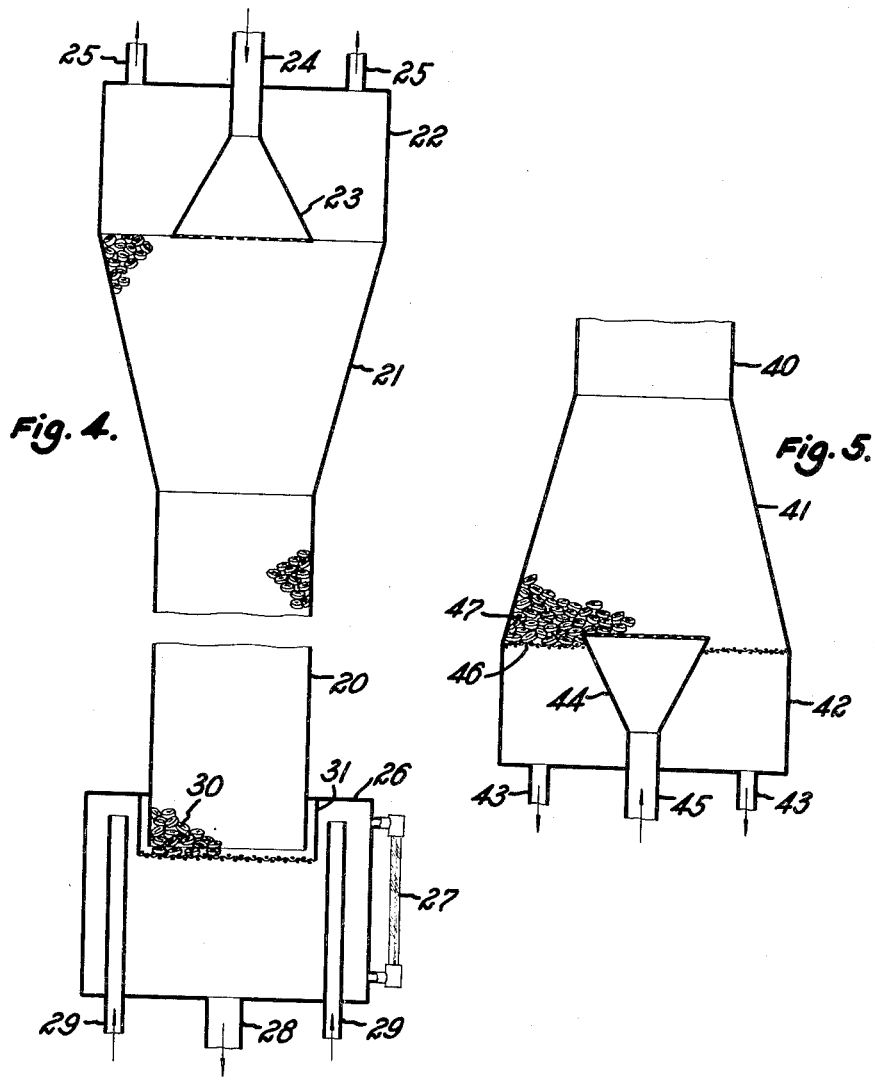

Dec. 12, 1944.  J. C. ELGIN  2,364,892
EXTRACTION COLUMN
Filed April 9, 1942  2 Sheets-Sheet 1
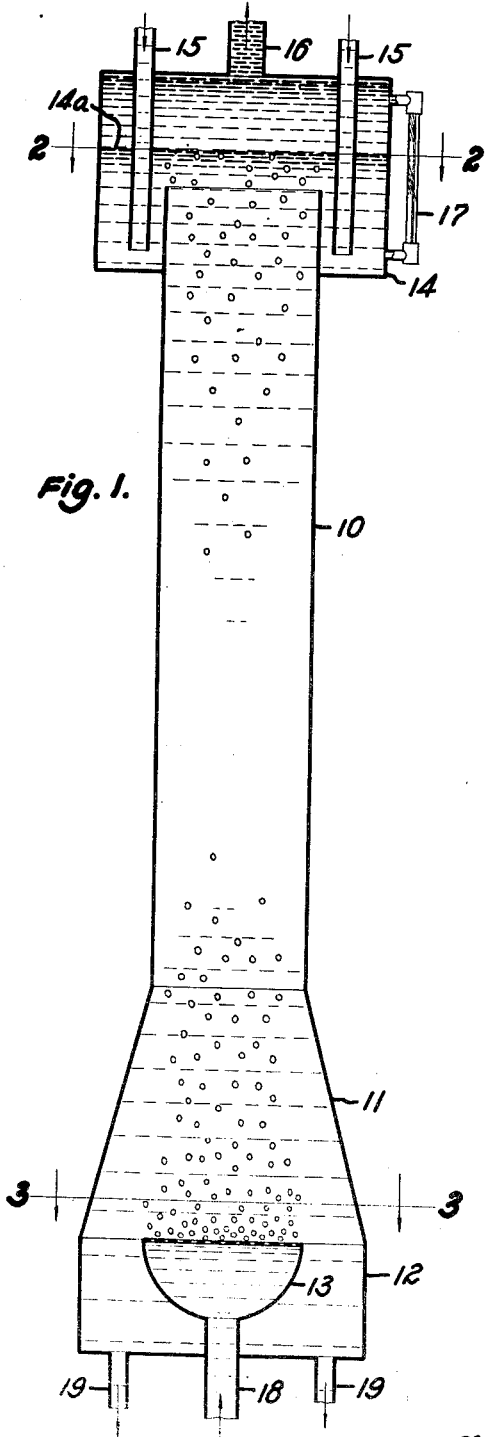
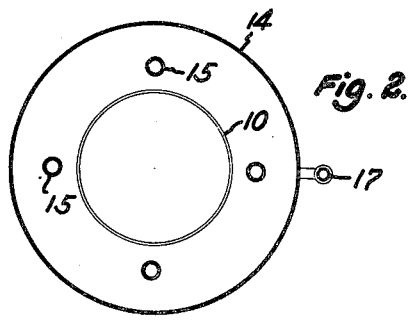
Fig. 2.
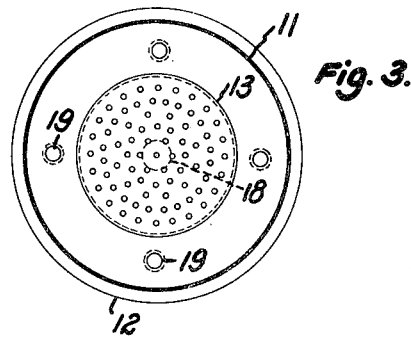
Fig. 3.
Inventor:
Joseph C. Elgin
By Pierce + Scheffler
Attorneys.

Dec. 12, 1944. J. C. ELGIN 2,364,892
EXTRACTION COLUMN
Filed April 9, 1942 2 Sheets-Sheet 2

Inventor:
Joseph C. Elgin
By Pierce & Scheffler
Attorneys.

Patented Dec. 12, 1944

2,364,892

UNITED STATES PATENT OFFICE 2,364,892

EXTRACTION COLUMN

Joseph C. Elgin, Princeton, N. J., assignor to Research Corporation, New York, N. Y., a corporation of New York Application April 9, 1942, Serial No. 438,341

6 Claims. (Cl. 23—310)

This invention relates to counter-current contact of immiscible liquids and to an improved column for effecting continuous counter-current extraction of such liquids. The method and apparatus of the invention may be employed with improved performance and results in the conduct of any liquid-liquid extraction in which the physical properties of the two liquids or liquid phases involved are such that their passage counter-currently through a column is possible. Examples of such processes are the extraction of dilute acetic acid with isopropyl ether, the extraction of lubricating oils with furfural, phenol, nitrobenzene and other solvents, the extraction of vegetable oils with furfural and other solvents, the extraction of impurities from rosin with furfural and other solvents, and numerous other similar processes.

An object of the invention is to provide a column which is capable of handling throughputs of the two liquids far greater than any design hitherto known or used, and at the same time, one which is more efficient in effecting the extraction of the desired component from the incoming feed. It permits the use of a column of much smaller diameter for a given hourly or daily throughput of feed and solvent which simultaneously can be shorter in height to accomplish a given degree of extraction of the desired component from the feed than has hitherto been possible with the designs of extraction columns hitherto known to the art. The practical result is to accomplish a given extraction in a far more efficient and economical manner.

My invention is based on the discovery that the design and construction of the ends of continuous countercurrent extraction columns, such as the spray and packed types, is the principal factor limiting the maximum performance and efficiency of such columns; that the end designs and constructions hitherto proposed and used are incorrect and seriously limit the performance of the column; and that the capacity and efficiency of columns may be greatly increased by means of the novel principles of the invention.

The columns hitherto known fail to function properly at very high rates of throughput because they tend to flood and both liquid phases begin to be ejected at one or both ends of the column. The higher the rates of flow possible through the extraction column, the more efficiently will it function. Columns of the designs hitherto known tend to reach a flooding or unsatisfactory state of operation at relatively low rates of flow much lower than those theoretically possible for a column of given cross-section; as previously stated, this has been due to their design.

Continuous counter-current liquid-liquid extraction columns depend for their functioning upon dispersion of one or the other liquid phase into discontinuous, globule, drop, or film form, which then passes counter-currently through the other continuous liquid phase by reason of a difference in their densities. The liquid made discontinuous is passed into one end of the column through a suitable distributor plate, nozzle, or dispersion device where it is broken up into globules or droplets. The other liquid is passed into the opposite end of the column in continuous form. If the discontinuous liquid is lighter, it is made to enter the lower end of the column and rises through the counter-currently flowing continuous liquid, recombines into continuous form at the interface between the two maintained at the desired level in the column, (usually in a top settling chamber) and leaves at the top of the column. If the discontinuous liquid is heavier than the other, it is allowed to enter the top of the column and fall through the lighter continuous liquid which enters the bottom of the column and flows countercurrently upward to exit at the top.

The rate and efficiency of extraction in the column is determined by the area of contact obtained between the two liquids. This is in turn, for two liquids of given physical properties, dependent upon the size, number and velocity of the drops of discontinuous liquid through the column. These are also interdependent factors since, for example, the number and velocity of the drops are determined by the rates of flow of both liquid phases through the column and the velocity of the drops also varies with their size. Reduction in the size of drops and/or increase in the rate of flow of either liquid phase through the column results in an increased number of drops, higher interfacial contact area, and higher extraction efficiency in the column provided that the design of the column is such as to avoid coalescence or recombination of drops into larger masses under these conditions. The latter is the case with my column but not with previous designs. For a given size of drops of liquids of given physical properties, there is a definite upper limit on the total rate of flow of the two through the column, commonly referred to as the flooding point, above which the column no longer functions satisfactorily. If the normal rate or velocity of passage of the drops is disturbed by any factor, or if coalescence occurs, the operation of the column becomes unsatisfactory before this theoretical upper limit is attained. Not only is the throughput of liquid reduced, but the contact area and extraction efficiency is also greatly reduced. As previously pointed out, this has always been the case in column designs previously known for reasons further described below.

If the column is operated unfilled as a spray column, one depends upon the contact area between the surface of the many small drops and the continuous liquid to provide the extraction. The column may also be filled with various types of packings with the object of increasing the contact area in the column by slowing down the drops, controlling their size, or causing the drops to film out over the surface of the packing. Many types of packing are possible, e. g., balls, Raschig rings, Berl saddles, Lessig rings, etc. In general, the operation of the column when packed is similar to that when unpacked and controlled by similar factors, but in this case the size and character of the packing, rather than the entrance nozzle, determines the drop size. The choice of packing versus not packing depends primarily upon economic factors involved in the cost of packing versus the cost of breaking up the liquid by forcing it through the distributor head. Other arrangements inside the column for breaking up and recombining the discontinuous liquid in a series of steps or stages are also possible, e. g., sieve plates, and bubble caps.

Interference with the normal rate of rise of the drops from the distributor head occurs in previous columns because of faulty entrance design. This is due to two factors: (1) an increased velocity of the continuous phase at the inlet for the discontinuous brought about by constriction in the free cross-section of the column at this point; (2) turbulence and cross currents set up by the use of an orifice type entrance at the inlet for the discontinuous phase and impingement of the continuous phase at the opposite end on the issuing stream of drops of the discontinuous liquid. The first results in a slowing up of the drops at this point allowing the following drops to catch up with resulting coalescence and flooding at the entrance or exit at flow rates far below those corresponding to the column proper. The second factor results also in coalescence and poor efficiency.

A characteristic feature of my invention is the avoidance of any interference with the normal rate of passage of the discontinuous liquid at both or either entrance, the most important being that where the discontinuous phase enters the column. This is accomplished by the use of a conical or diffusion type entrance for the discontinuous phase and construction and design of the column ends so that the velocity of the continuous phase at these points is below that in the column proper (rather than higher as in previous designs) and turbulence of the continuous stream leaving the column at this point is substantially avoided.

Generally speaking, the method of the invention comprises establishing a zone of contact between a continuous liquid phase stream and a discontinuous liquid phase stream counter-current thereto, withdrawing the continuous liquid phase stream from the zone of contact through a zone of progressively decreasing velocity of flow and introducing the discontinuous liquid phase stream into the zone of progressively decreasing velocity of flow while maintaining the velocity of flow of the continuous liquid phase not substantially above its velocity in the zone of contact. The cross-sectional area of the zone of progressively decreasing velocity of flow should preferably be at least as great as the combined cross-sectional areas of the inlet opening of the discontinuous liquid phase stream and of the zone of contact. The two liquid phase streams are preferably separated in a zone having a cross-sectional area substantially greater than the cross-sectional area of the zone of contact, thereby providing substantially reduced velocities of the continuous stream in the zone of separation.

The desired conditions may advantageously be provided by means of an extraction column comprising a vertical contact section of substantially uniform cross-sectional area, an inlet section providing a cross-sectional area progressively increasing from an end of the contact section and including means for introducing liquid thereinto at a level where the unobstructed cross-sectional area is at least approximately as great as the cross-sectional area of the contact section and means for withdrawing liquid therefrom beyond said level of introduction, and an outlet section of substantially greater cross-sectional area than the contact section including means for introducing a liquid thereto at a level adjacent the end of the contact vertical section and means for removing a liquid therefrom at a level remote from the end of the contact section. For the purpose of the present specification and claims, the term "inlet" end will be used to denote the end at which the discontinuous liquid phase is introduced and the term "outlet" end will be used to denote the end at which the discontinuous phase is removed.

Illustrative modes of operation and apparatus embodiments of the invention will be more particularly described with reference to the accompanying drawings in which:

Fig. 1 is a diagrammatic sectional elevation of a spray type extraction column embodying the principles of the invention;

Figs. 2 and 3 are sectional views on lines 2—2 and 3—3 of Fig. 1, respectively;

Fig. 4 is a diagrammatic sectional elevation of a packed type extraction tower embodying the principles of the invention adapted for operation with a discontinuous liquid phase heavier than the continuous phase, and Fig. 5 is a partial diagrammatic sectional elevation of a tower similar to the tower of Fig. 4 but adapted for operation with a discontinuous liquid phase lighter than the continuous phase.

The spray type extraction column of the invention of Figs. 1–3 is adapted, in the position shown, for operation with a discontinuous liquid stream lighter than the continuous liquid stream. The central section 10 provides a uniform contact zone. The inlet section is provided by conical or conoidal member 11 extending from the lower end of central section 10 to the settling chamber 12 which is of the same or slightly greater cross-section than the larger end of the conical member 11. 13 is the inlet nozzle or distributor through which the discontinuous liquid stream is introduced.

The outlet section of the column is provided by a settling chamber 14 of substantially greater cross-sectional area than the central section 10. The chamber is provided with inlet conduits 15 for the continuous liquid stream extending to the lower portion of the chamber and an outlet conduit 16 for the discontinuous liquid stream connected to the upper portion of the chamber. The settling chamber is advantageously provided with a sight glass 17.

The distributor 13 is connected with a supply conduit 18 and outlet conduits 19 are connected to settling chamber 12.

Of particular importance to the efficient operation of the extractor column are the expansion section 11 and the location of the distributor 13. The distributor is so positioned in the expansion section as to provide an annular passage between the distributor and the walls of the section which is at least as large in cross-sectional area as the contact section column. This insures that the velocity of the continuous phase at no point exceeds its velocity in the contact zone. Preferably the velocity of the continuous phase at the level of introduction of the discontinuous phase ($u_o$) is 0.2 to 0.9 times the velocity in the main contact zone ($u_c$). Since in a column of circular cross-section the velocity of flow at each level is proportional to the square of the diameter at that level, then the ratio of the square of the diameter of the contact section $d_c$ to the difference of the squares of the diameters of the distributor 13 and of the expansion section at the level of the distributor should be less than 1, preferably within the range 0.2 to 0.9.

For example, in the case of an extraction column having a cylindrical main contact section 10 inches in diameter ($d_c$) and a distributor head of the same diameter ($d_n$)

$$d_c = d_n = 10$$

If the ratio of the velocity of the continuous phase liquid stream at the level of the distributor to the velocity in the main contact section is selected to be 0.5, then the proper diameter of the expansion section at the level of the distributor ($d_o$) is given by $$\frac{d_c^2}{d_o^2 - d_n^2} = 0.5$$

$d_o = 17.3$ or approximately 17 inches.

The inside diameter of the upper end of the expansion section 11 should be exactly that of the inside of the main section of the column in order to avoid any obstruction to flow at this point.

The length of the expansion section 11 is selected to provide a wall angle to the vertical of from about 6° to about 45°, preferably, however, not over about 16°. If the wall angle to the vertical is $\theta$, the length $h$ of the expansion section is given by $$h = \frac{d_o - d_c}{2 \tan \theta}$$

For the dimensions set forth by way of example above and a wall angle of 9°, the length of the expansion section would be $$h = \frac{17 - 10}{2 \tan 9°} = 22 \text{ inches}$$

In general, within the approximate limits set forth above, the smaller the value of $u_o/u_c$ selected as the basis of the design the larger can be the value of $\theta$ employed. For very large diameter columns, say above 2 feet, it is preferred to use values of both $u_o/u_c$ and $\theta$ nearer the lower limits. If it is desired to employ several smaller distributor plates rather than a single large one, the dimensions of the conical entrance would be calculated similarly to the above, the cardinal principle being that the velocity of the continuous liquid at the distributor level be below that in the column proper. It will, in any case, be evident to one skilled in the art that the particular dimensions chosen should lead to an economically and mechanically feasible design.

The upper end of the column U, where the dispersed liquid leaves and the heavier continuous liquid enters, may be of exactly the same conical end design as the lower end. However, a somewhat similar construction here will usually give excellent and substantially equivalent performance. A suitable construction is shown in Fig. 1. The upper end of the column proper is projected 3 to 12 inches within the upper settling chamber 14. The diameter of this settling chamber is substantially the same as that of the lower settling chamber. The continuous liquid is then admitted through two or more inlet pipes spaced at uniform intervals around the circumference of the settling chamber and located from 1 to 2 inches from the outer wall of the chamber (Fig. 2). These inlet pipes are so arranged that they extend down into the annulus formed by the projecting column end and the walls of the settling chamber. They should extend down below the liquid interface 14a to slightly below the middle of the projecting column end. In this design, the continuous liquid in entering does not impinge on the stream of discontinuous liquid issuing from the column, but flows uniformly into the column over the edge of the projecting end. The drops of discontinuous liquid rise to the interface where they coalesce into the main bulk of lighter liquid at the top of the column. The latter then leaves the top of the settling chamber through a suitable exit pipe 16.

Both upper and lower settling chambers may be of any reasonable diameter, but should preferably not greatly exceed that of the lower end of the cone. Their length depends upon the particular liquid-liquid system and the drop size. In general, as their diameter is increased, their length may be proportionately decreased.

If the heavier liquid, rather than the lighter, is to be made discontinuous, the column is simply turned upside down so that the conical inlet section, through which the dispersed heavier liquid enters, is now at the top and the outlet section at the bottom. The lighter liquid enters the lower end of the column as before but is now continuous. The interface level in this case is now maintained in the lower settling chamber by use of any of the well known devices for its control.

In the case that the column is to be operated packed, the design and construction of the ends is the same as shown in Fig. 4 which illustrates a packed extraction column adapted for operation with the heavier liquid as the discontinuous phase.

In Fig. 4 20 is the main contact section, 21 is the conical expansion section, 22 is the inlet settling chamber with outlet conduits 25, 23 is the distributor with supply conduit 24, and 26 is the outlet settling chamber with sight glass 27, outlet conduit 28 and inlet conduits 29. The packing material 30 is supported in the column by means of basket 31.

The same principle must be observed here; namely, that the free cross-sectional area provided at the point where the distributor is located, must be equal to or greater than that of the column proper so that the velocity of the continuous liquid at no point exceeds that in the column proper.

The lower end of a packed extraction column adapted for operation with the lighter liquid as the discontinuous phase is shown in Fig. 5, wherein 40 is the lower end of the main column section, 41 is the conical expansion section, 42 is the inlet settling chamber with outlet conduits 43, 44 is the distributor with supply conduit 45, and 46 is the support for the packing 47.

In general, the distributor plate for the discontinuous liquid may be located just below, even with, or in the packing just above the packing support. However, if the continuous liquid wets the material from which the packing support is constructed preferentially to the discontinuous liquid, it is important to secure good performance to locate the distributor plate just slightly above the packing support within the first packing layer. In such a case, the packing support must not intervene between the drops of discontinuous liquid leaving the distributor and the packing. If it does, it interferes with the normal velocity of drop rise leading to coalescence at this point and unsatisfactory performance at relatively low rates of flow. Much higher throughputs are possible if this principle is observed. This location of the distributor plate above the packing support is particularly important where water or an aqueous solution is the continuous liquid and the discontinuous liquid is an organic solvent. The former usually preferentially wets the common materials from which packing supports are constructed; e. g. iron, steel, copper, brass, ceramic ware, porcelain, etc., at the expense of an organic liquid. If the discontinuous liquid preferentially wets the packing support, this precaution is not essential, but, in general, it is preferable to locate the distributor plate just above the packing support.

An important feature of the invention is that when the column is operated unpacked as a spray column, it may be operated satisfactorily without coalescence and with increased extraction efficiency at throughputs exceeding by 60% or more the true flooding point of a column of specified diameter (that is, above the throughput at which a column of the same diameter would theoretically flood without the expansion section—as previously pointed out, even this theoretical flooding point cannot be attained by columns of hitherto known designs and constructions) because of the conical inlet design. In this case a massed column of drops extends down into the conical section, the distance to which it extends depending upon the exact rate of flow. By lengthening the conical section, the throughput can be increased very considerably above the flooding point. This results in an economic saving in the construction of the column since otherwise an increase in the throughput could be obtained only by enlargement of the diameter of the column over its entire length. Mechanical considerations and the fact that the functioning of the column becomes more sensitive to fluctuations in the rates of flow to it when operated above the flooding point, dictate the extent to which advantage can be taken of this particular characteristic of the column in practice.

I claim:

1. Method of liquid-liquid extraction which comprises establishing a zone of contact between a vertically-flowing continuous liquid stream and a discontinuous liquid stream counter-current thereto, withdrawing the continuous liquid stream from said zone of contact through a zone of gradually increasing cross-section, and introducing the discontinuous liquid stream into said zone of gradually increasing cross-section at a level where the cross-sectional area left free for the passage of the continuous liquid stream is at least as great as the cross-sectional area of said zone of contact.

2. Method of liquid-liquid extraction which comprises establishing a zone of contact between a vertically-flowing continuous liquid stream and a discontinuous liquid stream counter-current thereto, withdrawing the continuous liquid stream from said zone of contact through a zone of gradually increasing cross-section, and introducing the discontinuous liquid stream into said zone of gradually increasing cross-section at a level where the cross-sectional area left free for the passage of the continuous liquid stream is greater than the cross-sectional area of said zone of contact.

3. Method of liquid-liquid extraction which comprises establishing a zone of contact between a vertically-flowing continuous liquid stream and a discontinuous liquid stream counter-current thereto, withdrawing the continuous liquid stream from said zone of contact through a zone of gradually increasing cross-section, and introducing the discontinuous liquid stream into said zone of gradually increasing cross-section at a level where the velocity of flow of the continuous liquid stream is from 0.2 to 0.9 times its velocity in said zone of contact.

4. Method of liquid-liquid extraction which comprises establishing a zone of contact between a vertically-flowing continuous liquid stream and a discontinuous liquid stream counter-current thereto, withdrawing the continuous liquid stream from said zone of contact through a zone of gradually increasing cross-section, introducing the discontinuous liquid stream into said zone of gradually increasing cross-section at a level where the cross-sectional area left free for the passage of the continuous liquid stream is at least as great as the cross-sectional area of said zone of contact, and introducing the continuous liquid stream into a settling zone wherein the velocity of said stream is substantially less than its velocity in said contact zone.

5. An extraction column comprising a vertical contact section of substantially uniform cross-sectional area, an inlet section at one end of said contact section providing a cross-sectional area progressively increasing from that of said end of the contact section and including inlet means having a plurality of perforations therein so constructed and arranged as to subdivide the entering liquid into a discontinuous stream at a level where the unobstructed cross-sectional area between the inlet means and the wall of the inlet section is at least approximately as great as the cross-sectional area of said contact section, a settling chamber at the larger end of said inlet section, means for withdrawing liquid therefrom, a settling chamber at the opposite end of said contact section comprising a direct vertical extension from said contact section having a cross-sectional area at least as large as the larger end of said inlet section, means for withdrawing liquid from one level of said chamber, and means for introducing liquid into another level of said chamber.

6. An extraction column comprising a vertical contact section of substantially uniform cross-sectional area, an inlet section at one end of said contact section providing a cross-sectional area progressively increasing from that of said end of the contact section and including inlet means having a plurality of perforations therein so constructed and arranged as to subdivide the entering liquid into a discontinuous stream at a level where the unobstructed cross-sectional area between the inlet means and the wall of the inlet section is at least approximately as great as the cross-sectional area of said contact section, a settling chamber at the larger end of said inlet section, means for withdrawing liquid therefrom, a settling chamber positioned around and extending beyond the opposite end of said contact section to provide an annular trough around said end of the contact section, means for introducing liquid into said annular trough, and means for withdrawing liquid from said settling chamber beyond said end of the contact section.

JOSEPH C. ELGIN.